United States Patent
He

(10) Patent No.: US 7,545,893 B2
(45) Date of Patent: Jun. 9, 2009

(54) SINGLE ANTENNA INTERFERENCE CANCELLATION VIA COMPLEMENT SUBSPACE PROJECTION IN SPATIAL-TEMPORAL EXPANSION OF NOISE ESTIMATION

(75) Inventor: Shousheng He, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 600 days.

(21) Appl. No.: 11/287,445

(22) Filed: Nov. 28, 2005

(65) Prior Publication Data

US 2007/0121766 A1 May 31, 2007

(51) Int. Cl.
*H03D 1/04* (2006.01)
(52) U.S. Cl. .................. 375/346; 375/316; 375/285; 348/607; 327/310; 327/384; 327/551; 455/296
(58) Field of Classification Search .............. 375/346, 375/285, 316; 327/310, 384, 551; 348/607; 455/296
See application file for complete search history.

(56) References Cited

U.S. PATENT DOCUMENTS

| | | | |
|---|---|---|---|
| 6,711,219 B2 * | 3/2004 | Thomas et al. .......... | 375/346 |
| 2003/0189972 A1 | 10/2003 | Berens et al. | |
| 2003/0218568 A1 | 11/2003 | Kober et al. | |

FOREIGN PATENT DOCUMENTS

WO 03/030440 A 4/2003

OTHER PUBLICATIONS

Tom Wallace et al ("Error Detection for fast Toeplitz Eignensolvers", IEEE Transactions on Signal Processing, vol. 44, No. 5, May 1996, p. 1268-1270).*
PCT International Search Report, mailed Mar. 23, 2007, in connection with International Application No. PCT/EP2006/068918.
Rangaswamy, Ed M., et al.: "A unified framework for space-time adaptive processing" Statistical Signal and Array Processing, 1998. Proceedings, Ninth IEEE Workshop on SP, Portland, OR, USA, Sep. 14-16, 1998. New York, NY, USA, IEEE, Sep. 14, 1998. pp. 360-363, XP010317924. ISBN: 0-7803-5010-3.
Yimin, Zhang et al: "Array Processing for Nonstationary Interference Suppression in DS/SS Communications Using Subspace Projection Techniques" IEEE Transactions on Signal Processing, IEEE Service Center, New York, NY, USA, vol. 49, No. 12, Dec. 2001. XP011059509. ISSN: 1053-587X.

(Continued)

*Primary Examiner*—Shuwang Liu
*Assistant Examiner*—Helene Tayong
(74) *Attorney, Agent, or Firm*—Potomac Patent Group PLLC

(57) ABSTRACT

Interference rejection in a wireless communication system involves determining a complement spatial-temporal signal subspace that is complement to a spatial-temporal signal subspace of an interference signal included in a received signal. The received signal is projected onto the complement spatial-temporal signal subspace, whereby the interference signal included in the received signal is reduced. Determining the complement spatial-temporal signal subspace can include estimating the interference signal; determining a Block Yule-Walker matrix for the estimated interference signal; and determining the complement spatial-temporal signal subspace from the Block Yule-Walker matrix.

4 Claims, 6 Drawing Sheets

OTHER PUBLICATIONS

Stefano, B. et al.: "Blind Adaptive Multiuser Detection for Asynchronous Dual-Rate DS/DCMA Systems" IEEE Journal on Selected Areas in Communications, IEEE Service Center, Piscataway, US, vol. 19, No. 2, Feb. 2001, pp. 233-244, XP011055311. ISSN: 0733-8716.

Abed-Meraim, K. et al.: "Blind equalization of multichannel IIR system using second order statistics" TENCON '96. Proceedings., 1996 IEEE Tencon. Digital Signal Processing Applications, Perth, WA, Australia, Nov. 26-29, 1996, New York, NY, USA, IEE, US, vol. 1, Nov. 26, 1996, pp. 446-451, XP010236868. ISBN: 0-7803-3679-8.

Carhoun, D., Institute of Electrical and Electronics Engineers: "Adaptive nulling and spatial spectral estimation using an iterated principal components decomposition" Speech Processing 1, VLSI, Underwater Signal Processing. Toronto, May 14-17, 1991, International Conference on Acoustics, Speech & Signal Processing. ICASSP, New York, IEEE, US, vol. 2, Conf. 16, Apr. 14, 1991, pp. 3309-3312, XP 010043732. ISBN: 0-7803-0003-3.

PCT Written Opinion, mailed Mar. 23, 2007, in connection with International Application No. PCT/EP2006/068918.

3GPP Technical Specification 45.005, "Technical Specification Group GSM/EDGE Radio Access Network; Radio Transmission and Reception", change request, GP-042829, Nov. 2004.

Söderström, T. and Stoica, P., "System Identification", Chapters 8.1 and 8.6, Prentice Hall, 1989.

Press, W.H. et al., "Numerical Recipes in C", Chapter 11, Cambridge University Press, 1992.

\* cited by examiner

SINGLE ANTENNA INTERFERENCE CANCELLATION VIA COMPLEMENT SUBSPACE PROJECTION IN SPATIAL-TEMPORAL EXPANSION OF NOISE ESTIMATION

BACKGROUND

The present invention relates to interference cancellation in wireless communications systems, and more particularly to interference cancellation in single antenna receivers.

In a wireless digital Time Division Multiple Access (TDMA) communication system, such as the Global System for Mobile communications (GSM) and the Enhanced Data rate for GSM Evolution (EDGE), the quality of a receiver's performance is limited by interfering signals that, when combined with an intended signal, distort that intended signal. Most interference comes from other users in the same system. The signals transmitted by users of the identical carrier frequency in a neighboring cell create Co-Channel Interferences (CCI), while users of adjacent carrier frequencies cause Adjacent-Channel Interference (ACI).

This situation is illustrated in FIG. 1, which depicts a wireless communication network 100 of the type in which the present invention may be practiced. The network 100 may be any of a number of well-known types such as, but not limited to, GSM, General Packet Radio Service (GPRS), Digital Advanced Mobile Phone System (DAMPS), and the like.

The network 100 comprises several base stations 101, 103, 105. Each base station covers three proximate areas arranged in a honeycomb-like structure as shown. Base station 101 covers proximate areas A1, A2 and A3, while base station 103 covers proximate areas C1, C2 and C3. Each base station 101, 103, 105 is able to cover three honeycomb areas by means of sectorized antennas.

It will be observed that, in FIG. 1, each of the areas is denoted by one of the letters A, B, and C, followed by one of the numbers 1, 2, and 3 (e.g., "A1", "A2", "A3", "B1", "B2", and so on). The letters represent a group of frequencies that are allotted for use by the base station and mobile stations located within the base station's three-sector group. Different groups have different frequencies allotted to them. The numbers denote a particular sector within the three-sector group. By allotting different frequencies to neighboring three-sector groups, CCI can be avoided. In accordance with well-known frequency reuse strategies, the same group of frequencies can be allotted to more than one three-sector group so long as the distance between these groups is considered to be sufficient to minimize (but not necessarily completely eliminate) CCI between them. The pattern that dictates in which cells the same frequencies will be allotted within the system 100 is called a "reuse pattern." Thus, FIG. 1 illustrates several different groups, each denoted A1, A2, A3; several different groups, each denoted B1, B2, B3; and several different groups, each denoted C1, C2, and C3.

In the situation illustrated in FIG. 1 the base station 105, which is allotted the same frequencies as is used by base station 101, transmits using the same channel as is used by the base station 101. As this signal has the potential to cause CCI within the three sectors served by the base station 101, this transmitted signal is denoted $I_{CO}$.

A user equipment (UE) 107, which is located in the area A3 served by the base station 101, receives an intended signal S from base station 101. At the same time, the UE 107 receives the interfering signal $I_{CO}$ transmitted by the base station 105.

The base station 103 does not transmit using the same frequencies as are used by the base station 101. Nonetheless, its transmissions can be on frequencies that are sufficiently close to the frequencies used by the base station 101 to cause ACI. To illustrate this point in FIG. 1, the UE 107 receives an interfering signal $I_{ADJ}$ from the base station 103. The Signals $I_{CO}$ and $I_{ADJ}$ are normally weak for networks with classical frequency planning, but may be strong and cause severe problems in a more modern network with a more aggressive frequency reuse scheme.

For a number of reasons, the particular way that an interfering signal manifests itself in the intended signal will differ depending upon the location of the receiver's antenna relative to the transmitter's antenna. Known techniques involving multiple antennas or antenna arrays exploit this so-called spatial diversity for the purpose of canceling interference in radio communications. However, due to physical constraints (e.g., size) and power consumption considerations, modern mobile receivers typically have only one antenna and therefore rely on Single Antenna Interference Cancellation (SAIC) technology to reduce the effects of interference. Since SAIC has a great potential impact on the network capacity, a new standard with a tightened CCI protection is expected to be specified for a class of receiver, with so-called Downlink Advanced Receiver Performance (DARP). See 3GPP TS 45.005, "Technical Specification Group GSM/EDGE Radio Access Network; Radio Transmission and Reception", change request, GP-042829, November, 2004 for more general background information about this topic. Thus it is of vital importance for receivers to satisfy the tougher requirement with implementation-friendly approaches.

Spatial-Temporal Whitening (STW) is a known approach for SAIC technology. This approach utilizes the fact that, in complex representation of the baseband signal, a Gaussian Minimum Shift Keying (GMSK)-modulated interference signal is 1-dimensional, and can be rejected by exploiting the spatial redundancy obtained from the real and imaginary dimensions of the complex received signal. In STW, the interference is modeled in a spatial-temporal autoregressive model, and a spatial-temporal filter is then applied to invert the process into white noise.

An aspect of STW is that spatial (or spatial-temporal) de-correlation is necessary, where a crucial operation is the Cholesky factorization of the inverted noise autocorrelation matrix:

$$F = \text{chol}(Q^{-1}) \tag{1}$$

where Q is the noise autocorrelation matrix. There are two problems with the operation.

First, due to the fact that the real and imaginary components of the received complex signal may be partially correlated, the noise autocorrelation matrix can lose rank. In such case the inversion of the noise autocorrelation is difficult, and the computation will not be performed.

Second, the Cholesky factorization requires that the matrix be positive definite. However, this is not always the case, especially when the temporal dimension is higher (e.g., a $2^{nd}$-order whitening filter), which is sometimes required in dealing with highly temporal interference, such as ACI. When the inverse of the noise autocorrelation matrix is not positive definite, Choleskey factorization will not be performed and the algorithm may be incomputable. Even if the received signal physically satisfies the condition of Eqn (1), the mathematical operation can still be critically ill-conditioned due to various impairments, such as noise estimation error, and limited resolution in fixed-point Digital Signal Processor (DSP) implementation of the algorithms, causing the algorithm to breakdown.

It is therefore desired to provide other approaches to single antenna interference cancellation.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that effect interference rejection in a wireless communication system. In one aspect, this involves determining a complement spatial-temporal signal subspace that is complement to a spatial-temporal signal subspace of an interference signal included in a received signal. The received signal is projected onto the complement spatial-temporal signal subspace, whereby the interference signal included in the received signal is reduced.

In another aspect, determining the complement spatial-temporal signal subspace comprises estimating the interference signal, and determining a Block Yule-Walker matrix for the estimated interference signal. The complement spatial-temporal signal subspace is then determined from the Block Yule-Walker matrix.

In yet another aspect, determining the complement spatial-temporal signal subspace from the Block Yule-Walker matrix comprises determining eigenvalues and corresponding eigenvectors of the Block Yule-Walker matrix. The eigenvectors are then sorted according to magnitude of absolute eigenvalues. The complement spatial-temporal signal subspace is determined as a subspace spanned by the eigenvectors corresponding to a number, L, of the smallest absolute eigenvalues.

In still another aspect, L represents a spatial dimension of the received signal; K represents a temporal dimension of the interference signal; and the Block Yule-Walker matrix is an $L(K+1) \times L(K+1)$ matrix.

In yet another aspect, adaptive interference rejection techniques and apparatuses are provided that involve sorting the eigenvalues in a descending order to produce a sorted eigenvalues vector; and calculating a center of gravity of the sorted eigenvalues vector. In such embodiments, projecting the received signal onto the complement spatial-temporal signal subspace is performed only if the center of gravity is smaller than a predefined threshold.

In alternative embodiments of the adaptive interference rejection methods and apparatuses, the eigenvalues are sorted in an ascending order to produce a sorted eigenvalues vector; and a center of gravity of the sorted eigenvalues vector is calculated. In such embodiments, projecting the received signal onto the complement spatial-temporal signal subspace is performed only if the center of gravity is larger than a predefined threshold.

BRIEF DESCRIPTION OF THE DRAWINGS

The objects and advantages of the invention will be understood by reading the following detailed description in conjunction with the drawings in which.

DETAILED DESCRIPTION

Figure 1:
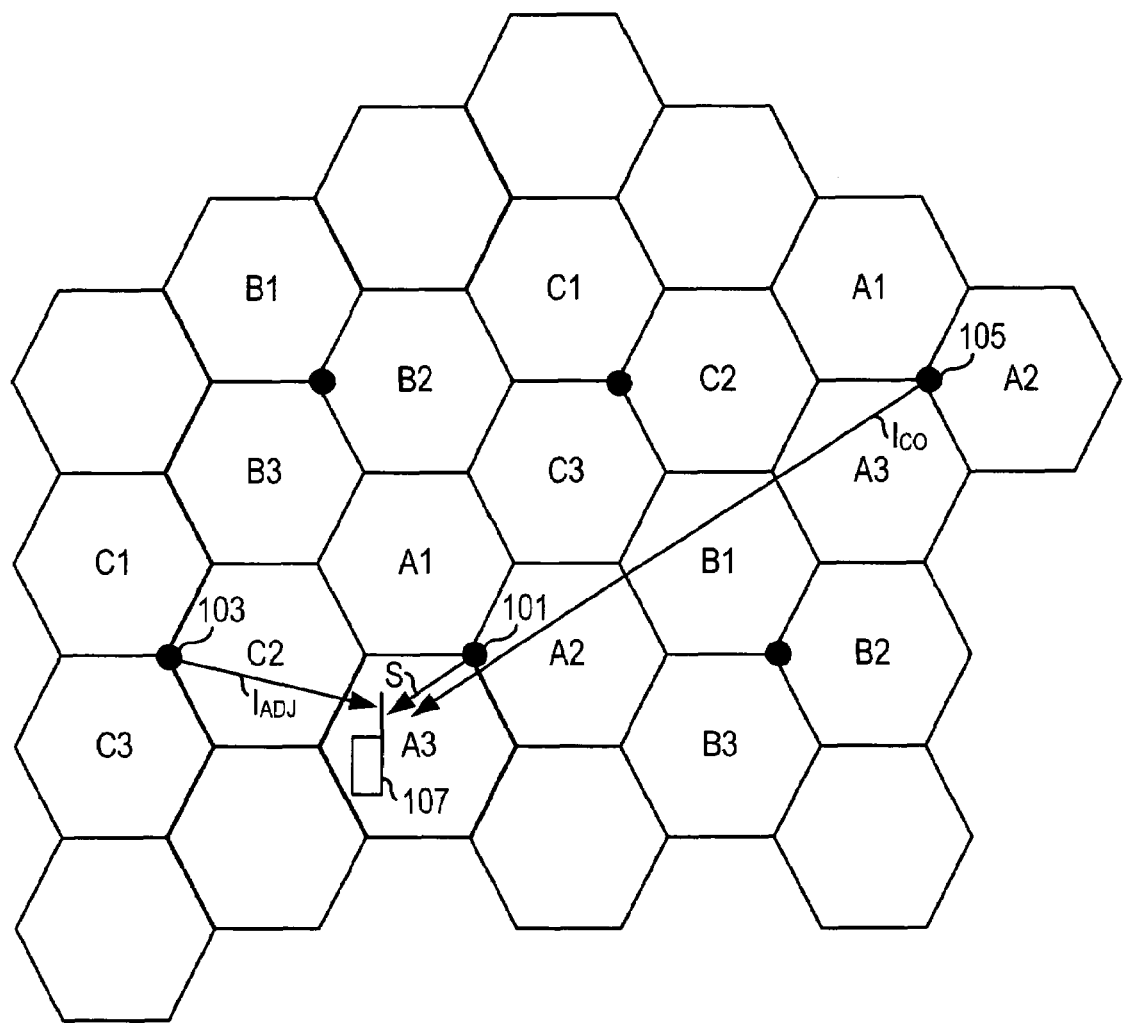
FIG. 1 depicts a wireless communication network of the type in which the present invention may be practiced.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Embodiments described herein address the single antenna interference cancellation problem in ways that are believed to be more mathematically stable, general and elegant than conventional techniques, and easier to expand in both spatial and temporal dimensions. In one aspect, it is found that a Block Yule-Walker matrix of the noise specifies the interference (plus noise) in a signal space spanned by spatial and temporal dimensions, in which the interference energy is concentrated in a subspace. A complement subspace can then be found that is orthogonal to the subspace in which the interference energy is concentrated. Maximal interference rejection can be achieved by projecting the received signal onto this complement subspace.

These and other aspects will now be described in greater detail, beginning first with a consideration of the spatial-temporal space expansion for the noise.

The possibly over-sampled complex receiver signal can be modeled based on a vector valued Finite Impulse Response (FIR) model of the radio channel, h(m), as follows:

$$x(n) = \sum_{m=0}^{M} h(m)s(n-m) + u(n) \qquad (2)$$

where $x(n)=[x_1(n) x_2(n) \ldots x_L(n)]^T$ is the received signal in L-spatial dimensions, each channel tap h(m) is an L-vector, s(n) is a single dimensional signal transmitted from the transmitter and $u(n)=[u_1(n) u_2(n) \ldots u_L(n)]^T$ is an L-vector representing the noise plus interferences. For example, when the received signal is a symbol spaced (without over-sampling) complex signal, L=2 and the vector is generated just from the real and imaginary components of the complex signal. An estimate of the noise, û(n), can be obtained via a transmitted signal sequence that is known to the receiver (e.g., a Training Sequence Code (TSC) in GSM):

$$\hat{u}(n) = x(n) - \sum_{m=0}^{M} \hat{h}(m)s(n-m) \qquad (3)$$

where the channel estimate can be obtained by means of, for example, Least Square (LS) estimation.

The noise is characterized by its autocorrelation, $Q_k$:

$$Q_k = E\{u(n-k)u^T(n)\} \qquad (4)$$

where E denotes a statistical expectation. The dimension of the noise autocorrelation characterizes the spatial diversity and the order of the discrete time correlation characterizes the temporal property of the noise.

In order to jointly characterize the spatial-temporal property of the noise, a single L(K+1)×L(K+1) matrix can be constructed, utilizing the different lags of noise autocorrelation:

$$Q = \begin{bmatrix} Q_0 & Q_{-1} & \cdots & Q_{-K} \\ Q_1 & Q_0 & \cdots & Q_{-K+1} \\ \vdots & \vdots & \ddots & \vdots \\ Q_K & Q_{K-1} & \cdots & Q_0 \end{bmatrix} = \begin{bmatrix} Q_0 & Q_1^T & \cdots & Q_K^T \\ Q_1 & Q_0 & \cdots & Q_{K-1}^T \\ \vdots & \vdots & \ddots & \vdots \\ Q_K & Q_{K-1} & \cdots & Q_0 \end{bmatrix} \qquad (5)$$

Note that $Q_{-k} = Q_k^T$ can be easily proven by its definition in Eqn (4).

The matrix Q given by Eqn (5) has the same structure as a matrix in a multi-variable (or block) Yule-Walker equation, which is used in parameter estimation in an auto-regression moving average (ARMA) model. Accordingly, the matrix Q, as given by Eqn (5), is herein referred to as a Block Yule-Walker matrix, which extends the interference signal into spatial-temporal space. For background information about Block Yule-Walker equations, reference is made to T. Söderström & P. Stoica, "System Identification", Prentice Hall, 1989. Chapter 8.1 of this reference covers "Yule-Walker Equations", and chapter 8.6 covers "The Whittle-Wiggins-Robbins Algorithm", which extends the single variate Leveison-Durbin algorithm (solving a Yule-Walker equation in $O(N^2)$ operations) into multivariate, where Block Yule-Walker equations are presented in the problem description.

The Block Yule-Walker matrix Q, as an eigen system, specifies the noise signal space spanned in L-spatial, (K+1)-temporal subspace. The matrix Q, constructed only by K-th order autocorrelation components $Q_k$, has very admissible mathematical properties. It is real and symmetrical, so all of its eigenvalues are real, and its eigenvectors are complete and orthogonal.

The Block Yule-Walker matrix Q, can be used to reduce the interference in the received signal. More particularly, when interference is strong, the noise energy will be concentrated in a certain subspace, depending on the spatial-temporal property (also referred to as "spatial-temporal colorization") of the interference. For example, a single-dimensional modulated CCI can have strong spatial correlation whereas an ACI will mostly have strong temporal correlation. The subspace with noise energy concentration can be identified by solving the eigen system, $$QV = V\Lambda \qquad (6)$$

where $\Lambda$ is a diagonal matrix containing all the eigenvalues, and V the corresponding eigenvectors. Techniques for determining V and $\Lambda$ from Q are known in the art, and so need not be described here in detail. A good reference in this respect is W. H. Press et al., "Numerical Recipes in C", Chapter 11, Cambridge University Press, 1992. Sorting the eigenvector according to ascending order of their absolute eigenvalues, exhibits the property of the spatial-temporally colored noise being expressed in a subspace $\Phi$ spanned by LK (or even smaller dimension) eigenvectors corresponding to the largest (absolute) eigenvalues $$\Phi = \underset{|\lambda| \geq \lambda_L}{span}\{v_L, v_{L+1}, \ldots, v_{LK-1}\} \qquad (7)$$

where $\lambda$ is an element of $\Lambda$, and $\lambda_L$ is the $L^{TH}$ element of the sorted version of $\Lambda$. (Note: the eigenvectors V are also sorted accordingly.)

Since the orthogonal eigenvector of the matrix is complete, it can be seen that there is also a subspace that is complement to $\Phi$, and that is spanned by the eigenvectors corresponding to the L smallest (absolute) eigenvalues:

$$\Psi = \Phi^\perp = \underset{|\lambda| < \lambda_L}{span}\{v_0, \ldots, v_{L-1}\} \qquad (8)$$

By projecting the receiver signal onto this complement subspace, the impairment of the spatial-temporal colored interference is minimized.

The joint spatial-temporal subspace projection is a mapping operation in the form of $$y(n) = V_{min}^T X(n) = V_{min}^T \begin{bmatrix} x(n) \\ x(n-1) \\ \vdots \\ x(n-k) \end{bmatrix} \qquad (9)$$

where $V_{min}$ is an L(K+1)×L matrix containing L eigenvectors of Q corresponding to the minimum eigenvalues. Eqn (9) can also be reformulated in matrix filtering, in a form of matrix polynomial convolution, similar to that of spatial-temporal whitening:

$$y(n) = \sum_{k=0}^{K} W^T(k)x(n-k) \quad (10)$$

where each L×L matrix W(k) is a sub-matrix of the L(K+1)×L matrix $V_{min}$, $$V_{min} = \begin{bmatrix} W(0) \\ \vdots \\ W(k) \end{bmatrix} \quad (11)$$

Unlike the existing approaches, the matrix is not required to be positive definite, and the eigenvector is sorted by the absolute eigenvalues.

Figure 2:
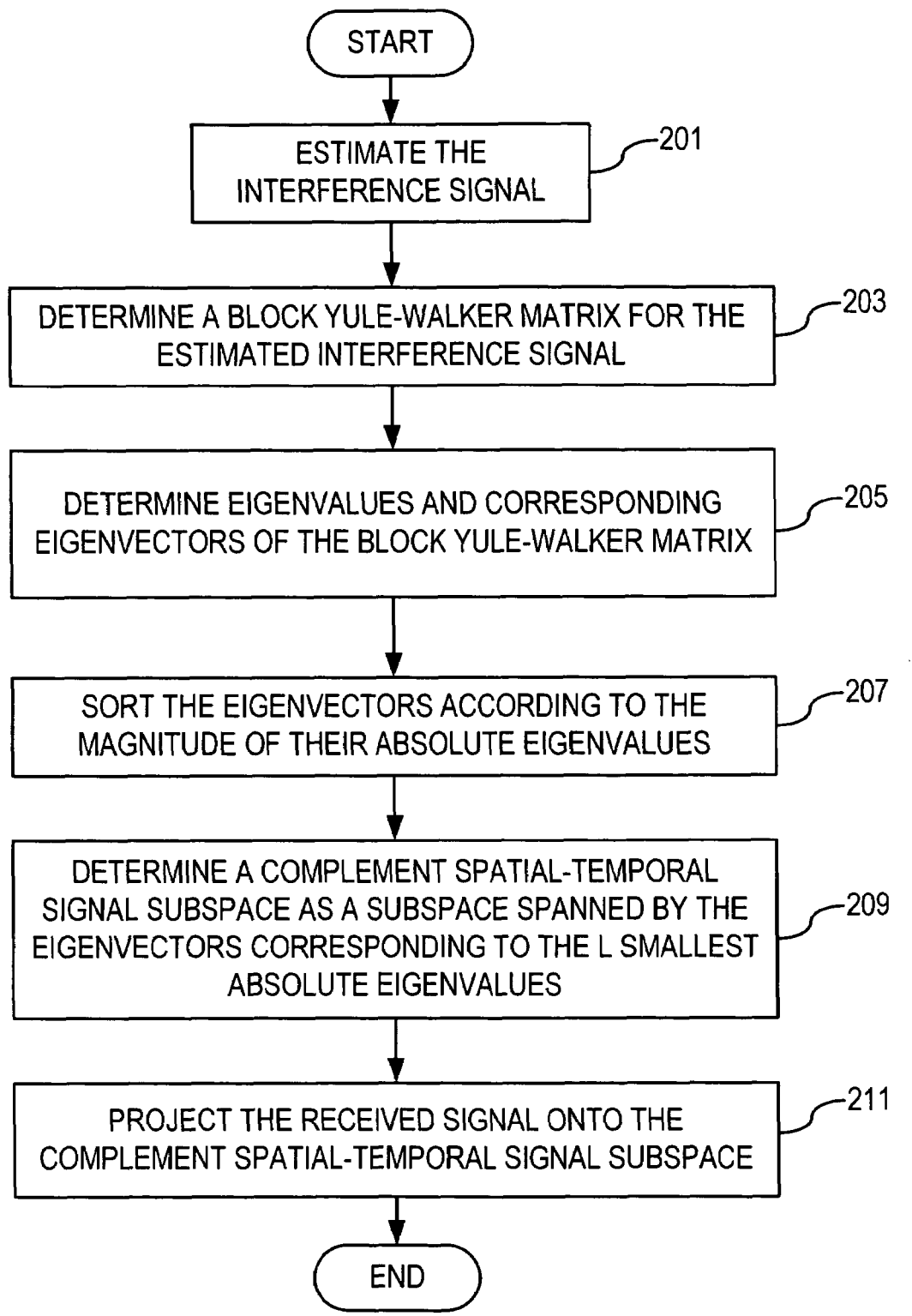
FIG. 2 is a flow diagram of exemplary processes carried out by a receiver that comprises logic that performs the variously illustrated processes.

An exemplary embodiment, using the above principles, will now be described with reference to FIG. 2, which is a flow diagram of exemplary processes carried out by a receiver, such as the receiver 107, that comprises logic that performs the variously illustrated processes. The interference or noise signal is estimated (step 201). This may be accomplished, for example, by means of techniques described earlier with respect to Eqn (3). Next, a Block Yule-Walker matrix is determined for the estimated interference signal (step 203). For example, one can determine the matrix Q as described earlier with reference to Eqn (5).

Eigenvalues and corresponding eigenvectors of the Block Yule-Walker matrix are then determined (step 205). This could be expressed, for example, as in Eqn (6).

The eigenvectors are next sorted according to the magnitude of their absolute eigenvalues (step 207). A complement spatial-temporal signal subspace is then determined as being a subspace spanned by the eigenvectors corresponding to the L smallest absolute eigenvalues (step 209).

The received signal is then projected onto the complement spatial-temporal signal subspace (step 211). The projected signal will have greatly reduced interference levels. This is illustrated visually in FIG. 3, which is a signal vector diagram including an intended signal S and an interference signal I, both 1-dimensional, represented in an extended 2-dimensional space by two vectors. Note that, in general, the signal subspace G and the interference subspace J are neither orthogonal nor overlapping.

Figure 3:
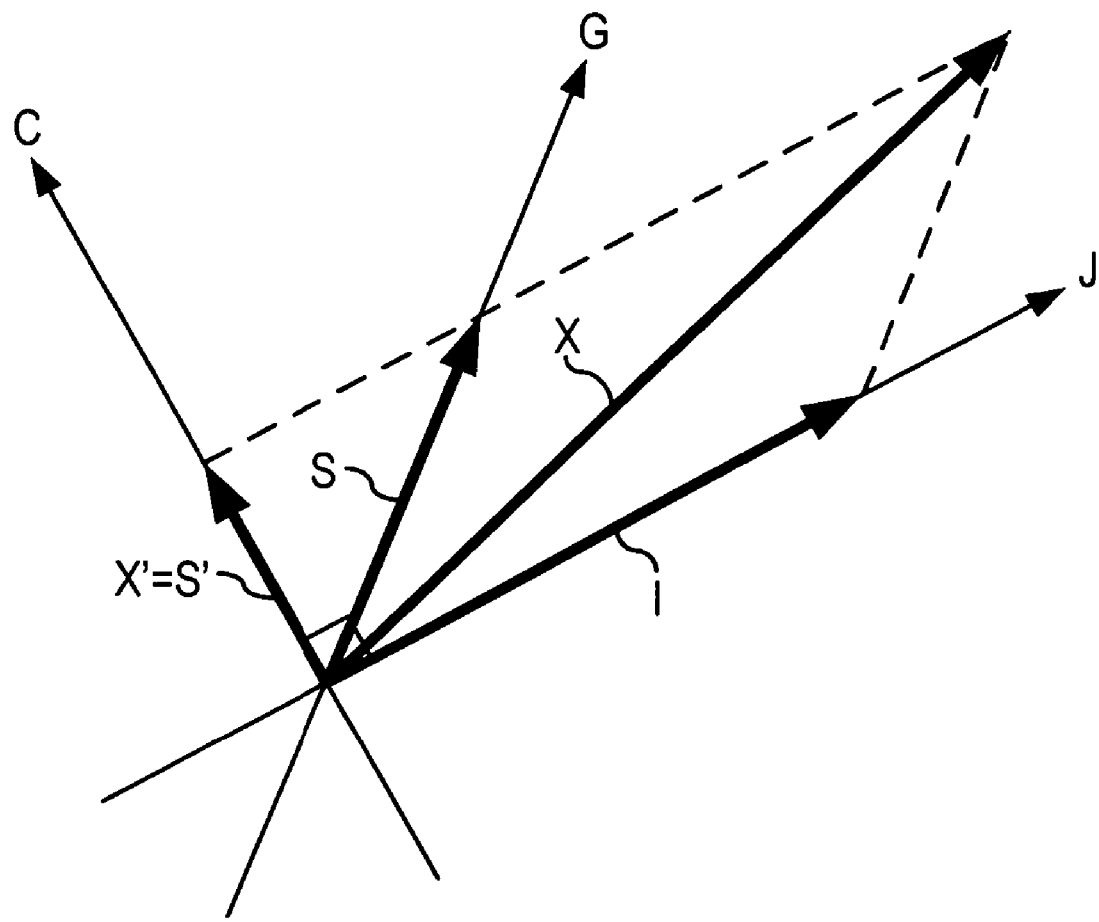
FIG. 3 is a signal vector diagram including an intended signal S and an interference signal I, both 1-dimensional, represented in an extended 2-dimensional space by two vectors.

The received signal, which is a composite of the intended signal S and the interference signal I, is designated by a vector X. A subspace, which is a complement to and orthogonal to the interference subspace J is designated C and is also one-dimensional. If we project the received signal X onto the subspace C, a vector X' is obtained, which is consequently orthogonal to the interference subspace J. It will be observed that, if it were possible to project the intended signal S onto the subspace C, a vector S' would be obtained that is exactly equal to the vector X'. As can be seen in FIG. 3, the result is that the interference component I is completely removed; all of the energy of the signal X'=S' is associated with the intended signal S. Although the amplitude of the signal S' is smaller than that of the intended signal S, it is still sufficiently large for correct demodulation.

Figure 4:
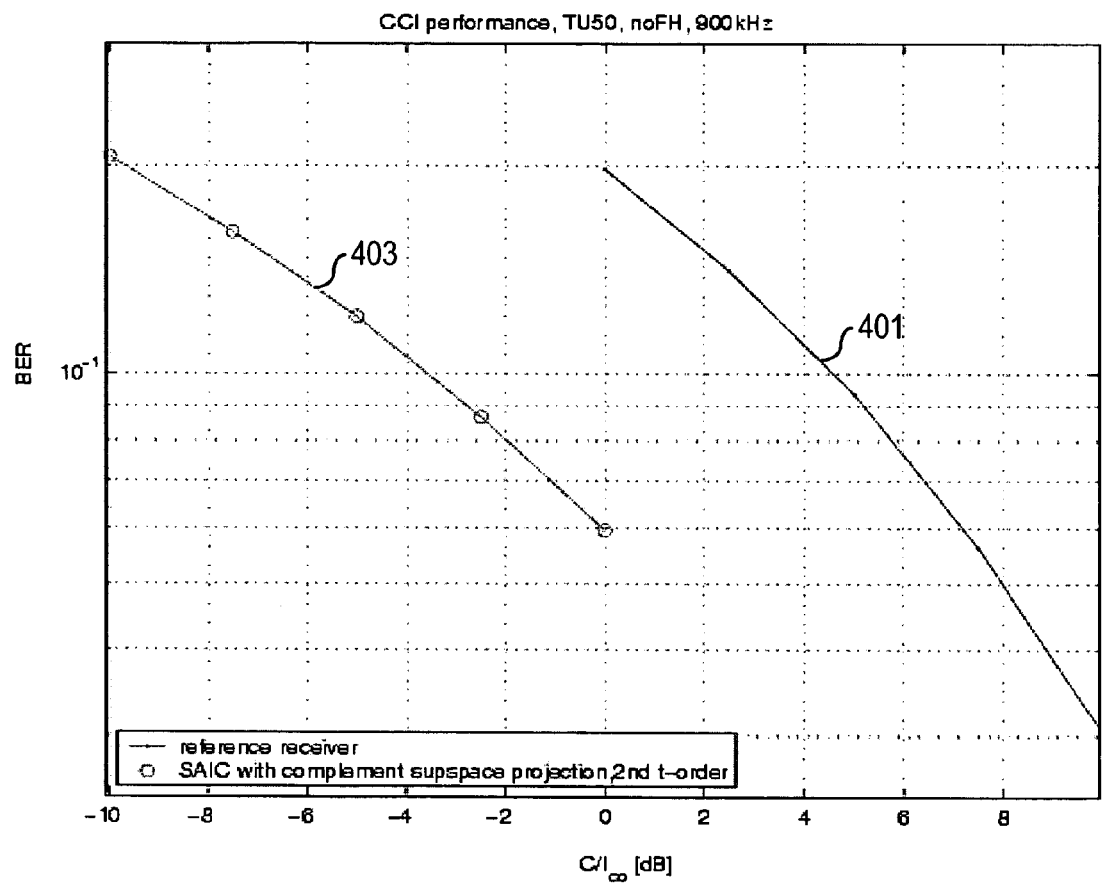
FIG. 4 is a set of graphs comparing the performance of a temporal whitening filter with that of an exemplary embodiment in a Typical Urban (TU) channel with a strong CCI interference.

These aspects have been tested using simulated data, and have been shown to be viable. FIG. 4 is a set of graphs comparing the performance (Bit Error Rate ("BER") plotted as a function of the Carrier to Interference ratio ("C/$I_{CO}$")) of a conventional temporal whitening filter (graph 401) with that of an exemplary embodiment of the invention (graph 403) in a Typical Urban (TU) channel with a strong CCI. Compared with a reference receiver that uses a temporal whitening filter to reduce interference, a gain of around 8-dB can be observed at a BER of 0.1.

Figure 5:
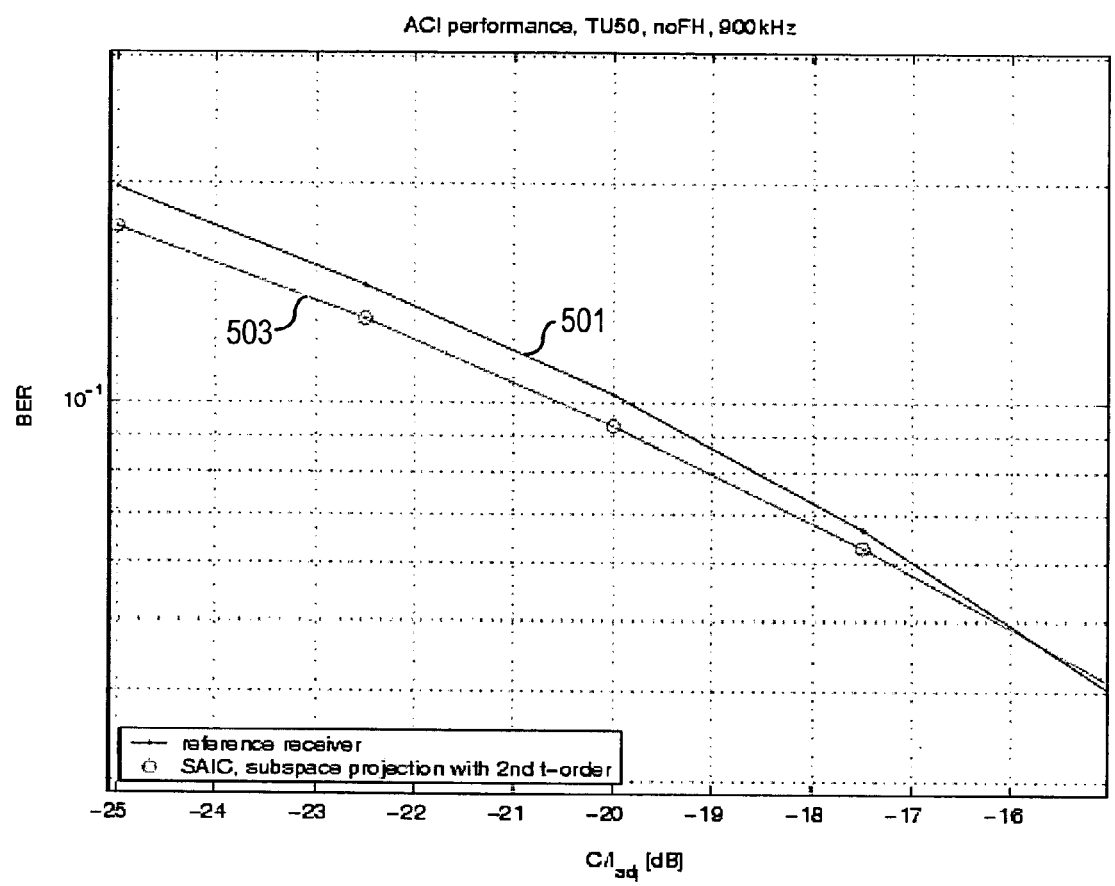
FIG. 5 is a set of graphs comparing the performance of a conventional temporal whitening approach with that of an exemplary embodiment.

FIG. 5 is a set of graphs comparing the performance (BER plotted as a function of C/$I_{ADJ}$) of a conventional temporal whitening approach (graph 501) with that of an exemplary embodiment of the invention (graph 503) in a Typical Urban (TU) channel with a strong ACI. It is known that ACI performance for current SAIC approaches is not as good as temporal whitening because the temporal order has to be low to avoid stability problem. With the inventive techniques described herein, however, stability is guaranteed, and higher temporal order can be used to reach the performance of a pure temporal whitening filter.

In another aspect of the invention, use of the complement subspace projection technique for interference reduction can be adaptively applied based on the amount of spreading of the eigenvalues. If the eigenvalues are not spread widely enough, the noise is not spatially/temporally correlated, or colored. This therefore indicates that the channel is associated with a "white" and structureless noise and, in order to avoid potential damage to the received signal, interference rejection should not be carried out.

Figure 6:
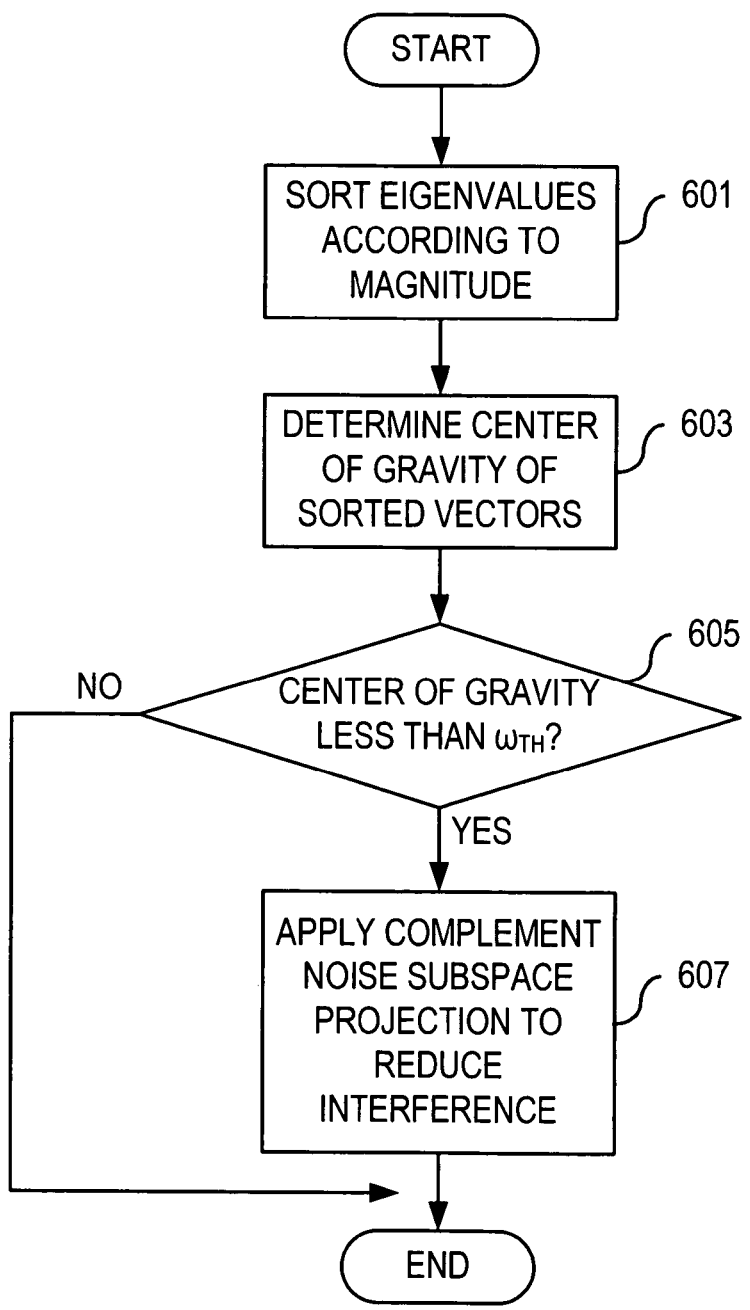
FIG. 6 is a flow chart depicting an exemplary embodiment of an adaptive technique utilizing the spreading of the eigenvalues of the noise autocorrelation matrix.

An exemplary embodiment of the adaptive technique utilizing the spreading of the eigenvalues of the noise autocorrelation matrix will now be described with reference to the flow chart depicted in FIG. 6. First, the L(K+1) eigenvalues are sorted according to magnitude (e.g., in descending order) (step 601):

$$P = \text{sort}(R) \quad (12)$$

where R=diag(Λ). Next, the center of gravity, ω, of vector P is calculated (step 603):

$$\omega = \frac{\sum_{k=1}^{L(K+1)} k p_k}{\sum_{k=1}^{L(K+1)} p_k} \quad (13)$$

The center of gravity is then compared to a threshold value, $\omega_{TH}$ (decision block 605). When the center of gravity is smaller than a predefined threshold, $\omega < \omega_{TH}$, ("YES" path out of decision block 605) the interference is considered sufficiently spatially and/or temporally colored so that complement noise subspace projection will be applied for interference rejection (step 607). This may be performed, for example, as described earlier with reference to FIG. 2. Otherwise, the interference is likely to be in the form of a white noise, and interference rejection processing should not be applied ("NO" path out of decision path 605).

In alternative embodiments, the adaptive technique includes sorting eigenvalues in an ascending, rather than descending, order. In such embodiments, instead of testing whether the center of gravity is less than a predefined threshold, the center of gravity is tested to see whether it is greater than a predefined threshold.

The threshold value, $\omega_{TH}$, can be selected based on simulation results and considerations of competing requirements that require compromises so that a receiver will have sufficient performance margins in all propagation channels (e.g., trade-offs made at the margins with respect to requirements in the technical standard for both sensitivity channels and interference channel conditions).

An advantage of the complement noise subspace projection technique for interference reduction is the numerical stability of the approach. This merit is especially important in implementations using DSP software that relies on fixed-point arithmetic. Additionally, the mathematical interpretation of the technique is more solid, meaning that it is better understood why it is effective for interference cancellation. This solid interpretation can lead to wider use of the techniques in the form of extensions of this application or in other applications, for example in spatial-temporal signal processing with an antenna array being used at both the transmitter and receiver in radio transmissions.

Another advantage of the complement noise subspace projection technique for interference reduction is that it is a unified approach for noise rejection in both the spatial and temporal domains.

The invention has been described with reference to particular embodiments. However, it will be readily apparent to those skilled in the art that it is possible to embody the invention in specific forms other than those of the embodiment described above.

For example, embodiments described above involved sorting the eigenvectors, V, according to ascending order of their absolute eigenvalues. However, it will now be readily recognized that equivalent techniques can be derived that instead involve sorting the eigenvectors, V, according to descending order of their absolute eigenvalues.

Additionally, some embodiments may not involve a full sorting of the eigenvectors, V, at all but instead use other techniques for determining the L smallest (absolute) eigenvalues, such as using partial sorting (e.g., bubble sorting).

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for interference rejection in a wireless communication system, comprising:
   determining a complement spatial-temporal signal subspace that is complement to a spatial-temporal signal subspace of an interference signal included in a received signal; and
   projecting the received signal onto the complement spatial-temporal signal subspace, whereby the interference signal included in the received signal is reduced,
   wherein determining the complement spatial-temporal signal subspace comprises:
      estimating the interference signal;
      determining a Block Yule-Walker matrix for the estimated interference signal; and
      determining the complement spatial-temporal signal subspace from the Block Yule-Walker matrix,
   wherein determining the complement spatial-temporal signal subspace from the Block Yule-Walker matrix comprises:
      determining eigenvalues and corresponding eigenvectors of the Block Yule-Walker matrix; and
      determining the complement spatial-temporal signal subspace as a subspace spanned by the eigenvectors corresponding to a number, L, of the smallest absolute eigenvalues,
   and wherein the method further comprises:
      sorting the eigenvalues in a descending order to produce a sorted eigenvalues vector; and
      calculating a center of gravity of the sorted eigenvalues vector,
   wherein projecting the received signal onto the complement spatial-temporal signal subspace is performed only if the center of gravity is smaller than a predefined threshold.

2. A method for interference rejection in a wireless communication system, comprising:
   determining a complement spatial-temporal signal subspace that is complement to a spatial-temporal signal subspace of an interference signal included in a received signal; and
   projecting the received signal onto the complement spatial-temporal signal subspace, whereby the interference signal included in the received signal is reduced,
   wherein determining the complement spatial-temporal signal subspace comprises:
      estimating the interference signal;
      determining a Block Yule-Walker matrix for the estimated interference signal; and
      determining the complement spatial-temporal signal subspace from the Block Yule-Walker matrix,
   wherein determining the complement spatial-temporal signal subspace from the Block Yule-Walker matrix comprises:
      determining eigenvalues and corresponding eigenvectors of the Block Yule-Walker matrix; and
      determining the complement spatial-temporal signal subspace as a subspace spanned by the eigenvectors corresponding to a number, L, of the smallest absolute eigenvalues,
   and wherein the method further comprises:
      sorting the eigenvalues in an ascending order to produce a sorted eigenvalues vector; and
      calculating a center of gravity of the sorted eigenvalues vector,
   wherein projecting the received signal onto the complement spatial-temporal signal subspace is performed only if the center of gravity is larger than a predefined threshold.

3. An apparatus for reducing interference in a received signal in a wireless communication system, comprising:
   circuitry configured to determine a complement spatial-temporal signal subspace that is complement to a spatial-temporal signal subspace of an interference signal included in a received signal; and
   circuitry configured to project the received signal onto the complement spatial-temporal signal subspace, whereby the interference signal included in the received signal is reduced,
   wherein the circuitry configured to determine the complement spatial-temporal signal subspace comprises:
      circuitry configured to estimate the interference signal;
      circuitry configured to determine a Block Yule-Walker matrix for the estimated interference signal; and
      circuitry configured to determine the complement spatial-temporal signal subspace from the Block Yule-Walker matrix,
   wherein the circuitry configured to determine the complement spatial-temporal signal subspace from the Block Yule-Walker matrix comprises:
      circuitry configured to determine eigenvalues and corresponding eigenvectors of the Block Yule-Walker matrix;
      circuitry configured to determine the complement spatial-temporal signal subspace as a subspace spanned by the eigenvectors corresponding to a number, L, of the smallest absolute eigenvalues, and wherein the apparatus further comprises:

circuitry configured to sort the eigenvalues in a descending order to produce a sorted eigenvalues vector; and circuitry configured to calculate a center of gravity of the sorted eigenvalues vector, wherein the circuitry configured to project the received signal onto the complement spatial-temporal signal subspace is operational only if the center of gravity is smaller than a predefined threshold.

4. An apparatus for reducing interference in a received signal in a wireless communication system, comprising:

circuitry configured to determine a complement spatial-temporal signal subspace that is complement to a spatial-temporal signal subspace of an interference signal included in a received signal; and circuitry configured to project the received signal onto the complement spatial-temporal signal subspace, whereby the interference signal included in the received signal is reduced, wherein the circuitry configured to determine the complement spatial-temporal signal subspace comprises:

circuitry configured to estimate the interference signal;

circuitry configured to determine a Block Yule-Walker matrix for the estimated interference signal; and circuitry configured to determine the complement spatial-temporal signal subspace from the Block Yule-Walker matrix, wherein the circuitry configured to determine the complement spatial-temporal signal subspace from the Block Yule-Walker matrix comprises:

circuitry configured to determine eigenvalues and corresponding eigenvectors of the Block Yule-Walker matrix;

circuitry configured to determine the complement spatial-temporal signal subspace as a subspace spanned by the eigenvectors corresponding to a number, L, of the smallest absolute eigenvalues, and wherein the apparatus further comprises:

circuitry configured to sort the eigenvalues in an ascending order to produce a sorted eigenvalues vector; and circuitry configured to calculate a center of gravity of the sorted eigenvalues vector, wherein the circuitry configured to project the received signal onto the complement spatial-temporal signal subspace is operational only if the center of gravity is larger than a predefined threshold.

* * * * *

UNITED STATES PATENT AND TRADEMARK OFFICE
CERTIFICATE OF CORRECTION

| | |
|---|---|
| PATENT NO. | : 7,545,893 B2 |
| APPLICATION NO. | : 11/287445 |
| DATED | : June 9, 2009 |
| INVENTOR(S) | : He |

It is certified that error appears in the above-identified patent and that said Letters Patent is hereby corrected as shown below:

In Column 2, Line 16, delete "modem" and insert -- modern --, therefor.

Signed and Sealed this

Twenty-second Day of December, 2009

David J. Kappos
*Director of the United States Patent and Trademark Office*